US010306436B2

(12) United States Patent
Felteau

(10) Patent No.: US 10,306,436 B2
(45) Date of Patent: May 28, 2019

(54) MANAGING MULTIPLE CONNECTED DEVICES USING DYNAMIC LOAD BALANCING

(71) Applicant: Sphero, Inc., Boulder, CO (US)

(72) Inventor: Wesley Felteau, Boulder, CO (US)

(73) Assignee: Sphero, Inc., Boulder, CO (US)

( * ) Notice: Subject to any disclaimer, the term of this patent is extended or adjusted under 35 U.S.C. 154(b) by 119 days.

(21) Appl. No.: 15/202,141

(22) Filed: Jul. 5, 2016

(65) Prior Publication Data

US 2017/0006089 A1 Jan. 5, 2017

Related U.S. Application Data

(60) Provisional application No. 62/188,654, filed on Jul. 4, 2015.

(51) Int. Cl.
*G06F 15/173* (2006.01)
*H04W 4/70* (2018.01)
*G08C 17/02* (2006.01)
*H04W 4/80* (2018.01)
*H04L 29/08* (2006.01)

(52) U.S. Cl.
CPC ............. *H04W 4/70* (2018.02); *G08C 17/02* (2013.01); *H04L 67/12* (2013.01); *H04L 67/148* (2013.01); *H04W 4/80* (2018.02); *G08C 2201/30* (2013.01); *H04L 67/1002* (2013.01)

(58) Field of Classification Search
CPC ... H04L 67/1004; H04L 67/148; H04L 67/12; H04L 67/1002; H04L 29/08; H04W 4/008; H04W 4/005; H04W 76/025; H04W 4/70; H04W 4/80; H04W 76/02; H04W 4/00; G08C 17/02; G08C 2201/30
See application file for complete search history.

(56) References Cited

U.S. PATENT DOCUMENTS

| | | | | |
|---|---|---|---|---|
| 2007/0097832 | A1* | 5/2007 | Koivisto | A63F 3/08 369/63 |
| 2008/0026671 | A1* | 1/2008 | Smith | A63H 17/36 446/456 |
| 2008/0139083 | A1* | 6/2008 | Lampert | A63H 19/24 446/397 |
| 2008/0168143 | A1* | 7/2008 | Shieh | H04L 12/1813 709/206 |
| 2010/0178982 | A1* | 7/2010 | Ehrman | A63F 7/0664 463/37 |
| 2016/0279525 | A1* | 9/2016 | Wilkins | A63F 13/803 |
| 2017/0269586 | A1* | 9/2017 | D'Andrea | G05D 1/0016 |

\* cited by examiner

*Primary Examiner* — Cheikh T Ndiaye
(74) *Attorney, Agent, or Firm* — Merchant & Gould P.C.

(57) ABSTRACT

Systems and methods are disclosed herein for load balancing connections of remote sensors in connection with a control session. A controller device can connect with a self-propelled device and a number of remote sensors. User can operate the self-propelled device to interact with the remote sensors, and such detection event may be logged or tallied in accordance with session rules. Upon detection of one or more additional controller device, the controller device can initiate a negotiation process to hand off one or more of the remote sensors to other controller devices to optimize bandwidth usage.

20 Claims, 7 Drawing Sheets

MANAGING MULTIPLE CONNECTED DEVICES USING DYNAMIC LOAD BALANCING

CROSS-REFERENCE TO RELATED APPLICATIONS

This application claims the benefit of U.S. Provisional Patent Application No. 62/188,654, entitled "Managing Multiple Connected Devices Using Dynamic Load Balancing", filed Jul. 4, 2015, which application is hereby incorporated by reference herein in its entirety.

BACKGROUND

User experience in connection with remotely operated devices continues to progress with advances in computing and network technologies. Existing technologies enable users to operate remote controlled devices using control applications executing on controller devices, such as smart phones or tablet computers. Processing means may be implemented on both the controller devices and the remote controlled devices.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
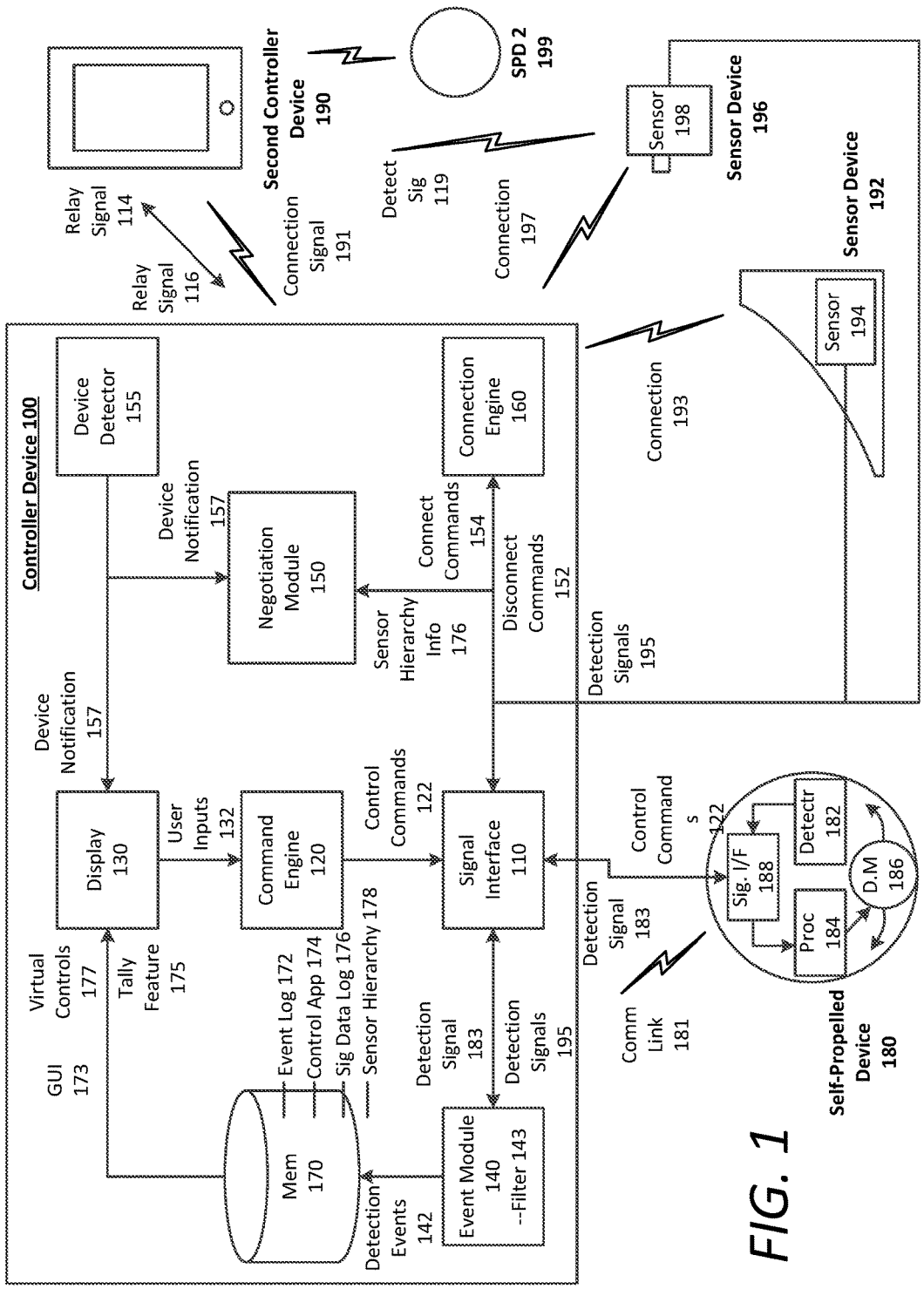
FIG. 1 is a block diagram illustrating an example controller device implementing dynamic load balancing of sensor connections, according to examples described herein.

Systems and methods are provided for managing multiple connected devices using dynamic load balancing. In accordance with many examples described herein, a computing device can connect with multiple remote sensors and a self-propelled device. The computing device can execute an application that initiates such connections and enables a user to remotely operate the self-propelled device. During operation, the user can maneuver the self-propelled device to interact with any of the multiple remote sensors, which, upon interaction, can transmit a detection event signal back to the computing device. The computing device can log such detection events and/or display a tally feature indicating such interactions. The remote sensors can be implemented in a variety of features, such as checkpoints, start/finish lines, ramps, barriers, target objects, destination objects, and the like.

Prior to or during a control session, a second computing device controlling a second self-propelled device may join the control session. The first computing device can identify the second computing device via, for example, proximity detection and/or user request. Upon identifying the second computing device, the first computing device can initiate a negotiation process to hand off connections to one or more of the remote sensors to the second computing device. Accordingly, the first and second computing devices can initiate the control session and detection events may be transmitted from the remote sensors to the respective computing device to which the remote sensors are connected. In order to determine whether the first or second self-propelled device interacted with a particular remote sensor, a detection signal from the remote sensor may be correlated with an event signal received by the connected self-propelled device.

As an example, the first computing device can receive a detection signal from a connected remote sensor. If a correlation signal is not received from the first self-propelled device, the first computing device can determine that the detection signal corresponds to an interaction between the second self-propelled device and the connected remote sensor. Accordingly, the first computing device can relay the detection signal to the second computing device so that the second computing device may log the detection event.

Multiple computing devices may join a control session, prior to or during the control session. In many implementations, the first computing device, along with the other computing devices, can dynamically negotiate connections with the remote sensors to maintain load balancing. Such dynamic negotiations can result in reduced signal latency to, for example, bolster transmission of the control commands from the computing devices to the self-propelled devices. As an example, a connection between a computing device and a self-propelled device may have limited bandwidth. Accordingly, a threshold amount of bandwidth is required for dynamic transmission of control commands to the self-propelled device. Detection signals received from many remote sensors, also connected to the computing device, can cause signal latency, which may delay transmission of the dynamic control commands to the self-propelled device. Accordingly, dynamic negotiations between computing devices to hand off remote sensor connections can balance signal latency to optimize bandwidth usage amongst the computing devices.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein can be implemented, in whole or in part, on computing devices such as digital cameras, digital camcorders, desktop computers, cellular or smart phones, personal digital assistants (PDAs), laptop computers, printers, digital picture frames, and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a non-transitory computer usable carrier medium capable of carrying such a program.

System and Device Description

FIG. 1 is a block diagram illustrating an example controller device implementing dynamic load balancing of sensor connections, according to examples described herein. A controller device 100 can be any number of wireless controllers or computing devices capable of establishing wireless links with any number of other devices. Accordingly, the controller device 100 may be a radio-frequency controller capable of operational control of a self-propelled device 180. The controller device 100 can also establish a connection (e.g., connection 193 and connection 197) with any number of sensor devices (e.g., sensor device 192 and sensor device 196). The controller device 100 may be a multi-functional wireless device, such as a mobile computing device or a tablet computer, implementing a control application 174 stored on a memory 170 of the controller device 100. The control application 174 may be specific to operations and communications performed herein.

According to many examples, a user of the controller device 100 can launch the control application 174, upon which a number of functions may be initiated. The control application 174 can cause a graphic user interface 173 to be generated and displayed on a display 130 of the controller device 100. The graphic user interface 173 can include virtual controls 177 that enable the user to operate the self-propelled device 180. These virtual controls 177 can comprise a virtual steering mechanism that may be calibrated, either manually or automatically, to a forward facing direction of the self-propelled device 180. Thus, upon initiation of the control application 174, a communication link 181 with the self-propelled device 180 may be established. The communication link 181 between the controller device 100 and the self-propelled device 180 can be established in accordance with one or more of a variety of wireless network technologies, including BLUETOOTH low energy, Classic BLUETOOTH, Wireless USB, and various Wi-Fi or other wireless standards. In many implementations, the established connection between the controller device 100 and the self-propelled device 180 may have limited bandwidth (e.g., BLUETOOTH low energy).

For certain self-propelled devices, a forward facing direction of the self-propelled device 180 may be difficult to ascertain for an initial calibration. For example, the self-propelled device 180 may be spherical, cylindrical, or otherwise rotationally symmetric in shape. On the self-propelled device 180 itself, an initial adjustment may be required to determine correct polar and radial angles to align a forward direct that is both (i) parallel to the surface of travel, and (ii) directionally aligned with a forward direction of the virtual controls 177. Accordingly, calibration of the virtual controls 177 can occur via manual user interaction with a directional marker on the self-propelled device 180. Additionally or alternatively, an automated calibration can occur in which the self-propelled device 180 performs one or more initial spins upon establishing the communication link 181. Asymmetry in the communication link 181 may be exploited to calibrate the polar and radial angles of the self-propelled device 180 to automatically align with a forward direction on the virtual controls 177. After performing the one or more initial spins, an internal drive mechanism 186 of the self-propelled device 180 can rotate the self-propelled device 180 such that the virtual controls 177 and the self-propelled device 180 are aligned for operation.

Additionally, the controller device 100 can connect, either automatically or via manual user input, with any number of sensor devices. As an example, upon initiation of the control application 174, the controller device 100 can perform a detection operation to detect sensor device 192 and sensor device 196. Upon detection of the sensor devices 192, 196, the controller device 100 can display on the graphic user interface 173 selectable identifiers for each of the sensor devices 192, 196. These selectable identifiers may be unique to each of the sensor devices 192, 196. As an example, sensor device 192 can correspond to a ramp including a sensor 194 to detect when the self-propelled device 180 interacts with the ramp. The selectable identifier can indicate that sensor 192 is a ramp, and the user can select the selectable identifier for the ramp to establish the connection 193. Alternatively, upon detecting sensor device 192 and sensor device 196, the controller device 100 can automatically establish connections 193 and 197 with the sensor devices 192, 196.

In various implementations, the user can provide user inputs 132 on the virtual controls 177 to operate the self-propelled device 180. The user inputs 132 can be interpreted by a command engine 120, which can translate the user inputs 132 into control commands 122 to be implemented on the internal drive mechanism 186 of the self-propelled device 180. The control commands 122 may be transmitted to the self-propelled device 180 via a signal interface 110 of the controller device 100 and over the communication link 181. Accordingly, dynamic control of the self-propelled device 180 may be performed by the user—where translation of user inputs 132 into control commands 122, and implementation of the control commands 122 on the internal drive mechanism 186 of the self-propelled device 180 are also performed dynamically.

Alternatively, raw data corresponding to the user inputs 132 may be transmitted directly to the self-propelled device 180 for translation into control commands 122 for implementation on the internal drive mechanism 186. In such variations, the raw data may be received by a signal interface 188 of the self-propelled device 180, and translated by a processor 184 executing translation instructions.

In accordance with many examples, the user can dynamically maneuver the self-propelled device 180 to interact with the sensor devices 192, 196. In some variations, the self-propelled device 180 can include a detector 182, to detect each instance the self-propelled device 180 interacts with the sensor devices 192, 196. Such interaction can comprise the self-propelled device 180 launching off a ramp (e.g., sensor device 192), or crossing a checkpoint or finish line (e.g., sensor device 196). Further examples of such sensor devices 192, 196 are contemplated. For example, such sensor devices can be implemented in a variety of features, such as checkpoints, start/finish lines, ramps, barriers, target objects, destination objects, and the like. Thus, upon detection of a sensor (e.g., sensors 194, 198) corresponding to the sensor devices 192, 196, the self-propelled device 180 can transmit a detection signal 183 to the signal interface 110 of the controller device 100.

In some examples, the detector 182 can detect not only generic detection events, but also identifiers of respective sensors (e.g., sensors 194, 198) of the sensor devices 192, 196 to correlate each detection event with a specific sensor device. Thus, the detection signal 183 transmitted from the self-propelled device 180 to the controller device 100 can include an identifier for the particular sensor device correlated to the detection event. After receiving the detection signal 183, the signal interface 110 can transmit the detection signal 183 to an event module 140 of the controller device 100.

The event module 140 can log the detection event 142 corresponding to the detection signal 183 in an event log 172 stored in the memory 170. In variations, the event module 140 can parse the detection signal 183 to determine with which of the sensor devices 192, 196 the self-propelled device 180 interacted. Furthermore, the event module 140 can maintain, in the memory 170, a signal data log 176 which can temporarily store received signal data from detection signals 183, 195 and/or relay signals 114, 116 until a correlation is made.

For variations involving a plurality of controller devices, self-propelled devices, and sensor devices, an event filter 143 of the event module 140 may parse each received signal to perform correlation operations. For example, a detection signal 183 received by the self-propelled device 180 may be logged by the event filter 143 in the signal data log 176 until a detection signal 195 received from a sensor device 192 is correlated to the detection signal 183 received from the self-propelled device 180. Thus, the event filter 143 can manage the signal data log 176 continuously to correlate detection signal received from (i) the self-propelled device 180, and any of the plurality of sensor devices 192, 196. Further, there is no limit to the number of sensor devices that may interact with the self-propelled device 180 during a control session.

Figure 2:
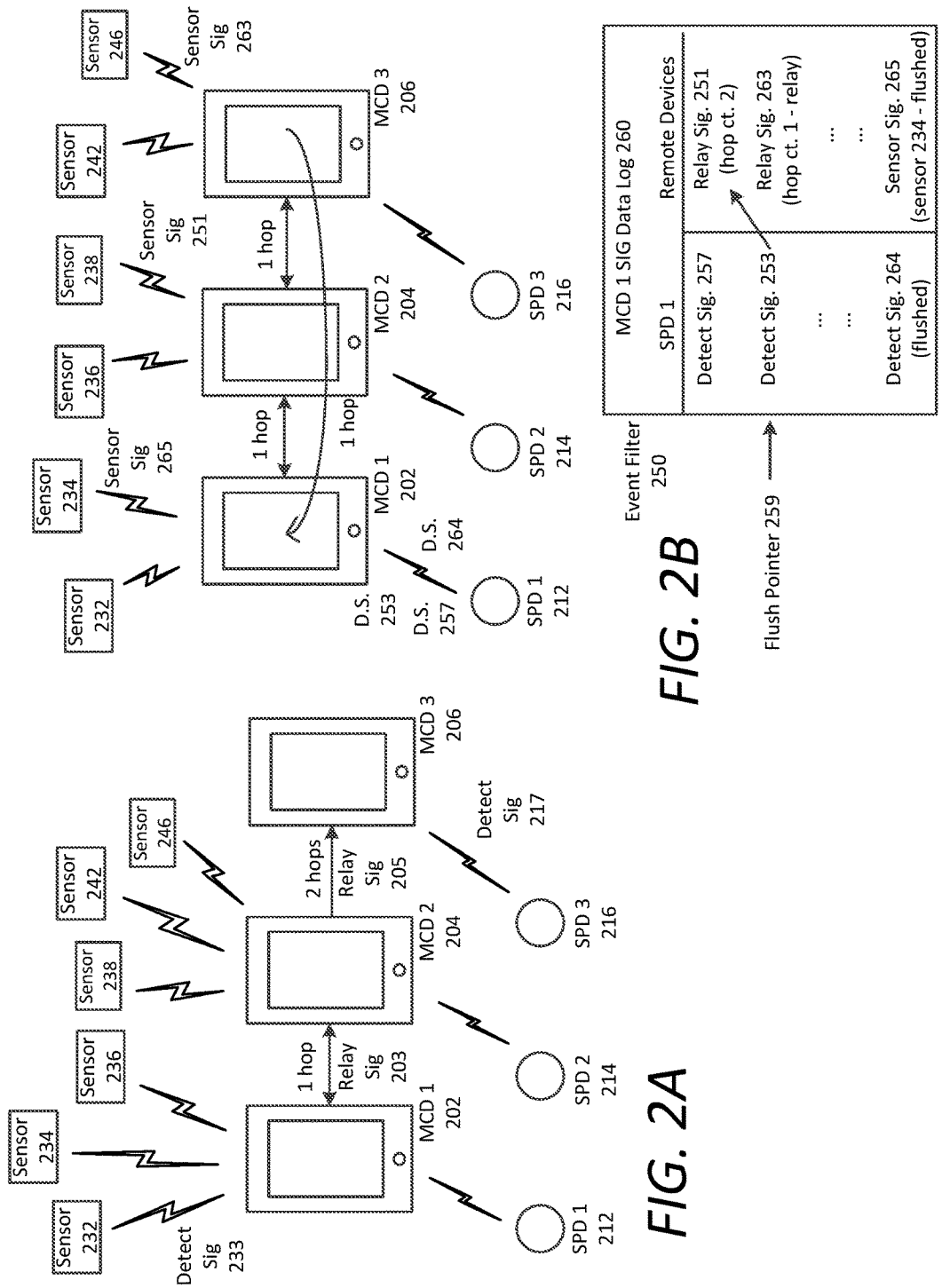
FIGS. 2A-2B illustrate an example of a negotiation process for dynamic load balancing of sensor connections between computing devices.

The signal data log 176 may be envisaged as a two column log, which the event filter 143 can manage continuously (discussed below with respect to FIG. 2B). Data from received detection signals (e.g., detection signal 183) from the self-propelled device 180 can be logged in one column and data from signals received from sensor devices (e.g., detection signal 195) and other controller devices (e.g., relay signal 116) can be logged in a second column. When the event filter 143 correlates a signal received by the self-propelled device 180 to another received signal (e.g., from a sensor device or another controller device), the event filter 143 can flush the corresponding signal data from both, and dynamically continue signal data management and correlation operations. On the other hand, if the event filter receives a detection signal from a connected sensor device (e.g., detection signal 195), and no correlated signal data exists in the self-propelled device column of the signal data log 176, the event filter 143 can automatically relay the detection signal to, for example, a next controller device (e.g., second controller device 190). Prior to relaying the signal, the event filter 143 can embed a hop count into the relayed detection signal.

The event module 140 may also log progression data in the memory 170 to keep track of user progress over a given control session. Such progress may correspond to task-oriented operations in connection with a game, in which the user controls the self-propelled device 180 to interact with a number of sensor devices in order to complete a number of tasks or achievements. Additionally or alternatively, the progress may correspond to a control session in which multiple users of respective self-propelled devices interact in, for example, a race around a track populated with sensor devices. Thus, individual "control sessions" corresponding to such task-oriented operations or racing applications may correspond to a time period between an initial launch of the control application 174 to deactivation and disconnection with the self-propelled device 180 and/or the sensor devices 192, 196.

In accordance with the above-description, the event module 140 can control a tally feature 175 displayed on the graphic user interface 173 in conjunction with the virtual controls 177. The tally feature 175 can respond to detection events 142 of each sensor device the self-propelled device 180 interacts with, and based on a particular application (e.g., the control application 174), can tally a score or ranking in accordance with executed rules of the application. For example, for racing application implementations, each detection event 142 can correspond to progress around a race track. Additionally or alternatively, the detection event 142 may be correlated with a particular sensor device (e.g., sensor device 192), such that rules tailored to the racing application can award respective point totals or awards for the interaction with the particular sensor device. Thus, the tailored rules to the particular application may include custom formulaic models (e.g., individualized scoring algorithms) to rank or score the user. Furthermore, each sensor device may be attributed to a static or dynamic rule that may or may not be altered throughout a control session, such as a race.

In variations, the tally feature 175 on the graphic user interface 173 can reflect the dynamic rankings of all users during a control session. Alternatively, progress may be saved for previous control sessions, such that initiation of the control application 174 can display an accumulated ranking or tally on the tally feature 175. Detection events 142 logged by the event module 140 may be reflected in the tally feature 175 of the controller device 100. Furthermore, communication links between multiple controller devices can transmit tally data such that each tally feature 175 of each controller device reflects the same tally information dynamically over a given control session.

In various implementations, detection signals 195 can be received from the sensor devices 192, 196 themselves. In such implementations, the sensor devices 192, 196 can include communication functionality such that detection signals 195 may be transmitted directly to the controller device 100. The signal interface 110 can receive such detection signals 195 for transmission to the event module 140, which can parse the detection signals 195, and log the detection events 142 accordingly. The detection signals 195, received directly from the sensor devices 192, 196, can be transmitted over the connections 193, 197 with the sensor devices 192, 196. The detection signal 195 can include one or more of an indication of a detection event 142 or a unique identifier of the sensor device transmitting the detection signal 195. Additionally, the detection signal 195 can include an identifier for a particular self-propelled device that caused the detection event.

According to the above examples, the event module 140 of the controller device 100 can perform a correlation operation between received detection signals 183 from the self-propelled device 180 and received detection signals 195 from the sensor devices 192, 196, to determine and/or confirm that the self-propelled device 180 performed the interactions with the sensor devices 192, 196—as opposed to a different self-propelled device. Accordingly, the event module 140 can include an event filter 143 that can filter through (i) detection events 142 corresponding to the self-propelled device 180 interacting with the sensor devices 192, 196, versus (ii) detection events corresponding to other self-propelled devices interacting with the sensor devices 192, 196. Based on the filtering operations performed by the event filter 143, the event module 140 may log detection events 142 performed only by the self-propelled device 180, which may be reflected in the tally feature 175 on the graphic user interface 173.

Due to signal latency, transmissions between the sensor devices 192, 196, the self-propelled device 180, and the controller device 100 can cause delays in, for example, the transmission of control commands 122 to the self-propelled device 180, which can hinder the dynamic operation of the self-propelled device 180 by the user. Thus, it may be desirable to perform a connection handoff of one or more of the sensor devices 192, 196 to a second controller device 190 participating in a control session in order to optimize bandwidth usage and prevent delay in, for example, the transmission of control commands 122 to the self-propelled device 180.

According to many examples described herein, a user of the second controller device 190 can dynamically operate a second self-propelled device 199 during the control session in which the first controller device 100 participates. The second self-propelled device 199 can interact with the sensor devices 192, 196, and the detection events associated with the second self-propelled device's 199 interactions would be transmitted to the first controller device 100. The event filter 143 of the event module 140 would filter out detection events not associated with the self-propelled device 180. These unassociated detection events may be relayed, via a relay signal 114 to the second controller device 190, so that the second controller device 199 may log the detection events in its own event log.

In various implementations, multiple controller devices may participate in a control session, taxing the bandwidth of the connection protocol implemented by the controller device 100 when such detection events are received from each of multiple sensor devices. For example, the communication link 181 with the self-propelled device 180, the connection 193 with sensor device 192, and the connection 197 with sensor device 196, may all be established using BLUETOOTH low energy, which, while optimizing power usage, provides limited bandwidth—especially considering the desired bandwidth usage for transmitting dynamic control commands 122 to the self-propelled device 180. Receipt of detection signals 183, 195 from the self-propelled device 180 and each of the sensor devices 192, 196 for every detection event (whether associated with the self-propelled device 180 or other self-propelled devices) can further tax available bandwidth of the BLUETOOTH low energy connections.

To optimize bandwidth usage amongst multiple controller devices, thereby spreading the transmission of detection and relay signals, the controller device 100 can include a negotiation module 150 to negotiate connection handoffs of sensor devices. The controller device 100 can also include a device detector 155 to detect other controller devices participating in the control session. As an example, a connection signal 191 for the second controller device 190 may be detected by the device detector 155 which can send a device notification 157 to the negotiation module 150. The negotiation module 150 can coordinate with the second controller device 190 to determine which of the sensor devices 192, 196 may be handed off to the second controller device 190.

In some examples, the negotiation module 150 can identify a location or direction towards the second controller device 190. The negotiation module 150 may then identify a sensor device in that direction and select say, sensor device 196 for handoff to the second controller device 190. Alternatively, the memory 170 can store a sensor hierarchy 178. The sensor hierarchy 178 may be based on, for example, an order in which each of the sensor devices 192, 196 were connected to the controller device 100. The negotiation module 150 can hand off one or more sensor devices to the second controller device 190 based on the sensor hierarchy 178. Alternatively still, the negotiation module 150 can receive location information, or determine respective locations, for each of the sensor devices 192, 196, the second controller device 190, and the controller device 100. Based on the respective locations, the negotiation module 150 can identify a most practical solution for handing off the sensor device(s). For example, the negotiation module 150 can determine that sensor device 194 is closer to the controller device 100, and therefore retain the connection 193 while handing off the connection 197 to the second controller device 190. Additionally or alternatively, the negotiation module 150 can determine that sensor device 198 is closer to the second controller device 190 than to the first controller device 100, and therefore can cause the connection 197, corresponding to sensor device 196, to be handed off to the second controller device 190.

In some examples, the handoff of sensor devices may be coordinated by the negotiation module 150 with the second controller device 190. Thus, the second controller device 190 can agree to establish a connection with the sensor device 196 while the negotiation module 150 transmits a disconnect command 152 to a connection engine 160 of the controller device 100. The connection engine 160 can manage connections between the controller device 100 and the sensor devices 192, 196. Upon receiving the disconnect command 152, the connection engine 150 can disconnect from the sensor device 196, while the second controller device 190 establishes a connection with the sensor device 196.

In accordance with two-controller device examples with reference to FIG. 1, the user of the first controller device 100 can operate the first self-propelled device 180 to interact with either or both of the sensor devices 192, 196. When the first self-propelled device 180 interacts with sensor device 192, a detection signal 195 can be transmitted from sensor device 192 to the controller device 100. At essentially the same time, a detection signal 183 can be transmitted from the self-propelled device 180 to the controller device 100. The event module 140 of the controller device 100 can determine, based on the detection signals 183, 195, that the first self-propelled device 180 interacted with the sensor 194 of the sensor device 192, and log the detection event 142 in the event log 172 of the memory 170.

If, however, the second self-propelled device 199 interacts with the sensor 194 of sensor device 192, the sensor device 192 can transmit a detection signal 195 to the first controller device 100. Yet, the first controller device 100 will not receive a correlated detection signal from the self-propelled device 180. Accordingly, the event filter 143 of the event module 140 can identify that the detection signal 195 is not associated with the first self-propelled device 180. In such examples, the detection signal 195 can be relayed via, for example, a relay signal 114 including the detection event with sensor 194 of sensor device 192. In some examples, the relay signal 114 may be generated by the event module 140 to include a hop count.

Thus, in the example provided, the second self-propelled device 199 will have transmitted a detection signal to the second controller device 190 (based on the interaction with the sensor device 192), yet no correlated signal will have been received from the sensor device 196 to which the second controller device 190 is connected. The second controller device 190 may then receive the relay signal 114 from the first controller device 100 and identify the hop count indicating that a detection signal was processed but not logged by the first controller device 100. Accordingly, the second controller device 190 may correlate the relay signal 114 with the detection event between the second self-propelled device 199 and the sensor 194 of the sensor device 192, and log the detection event internally.

Alternatively, the first controller device 100 may simply relay the detection signal 195 received from the sensor device 192 once it is determined that the detection signal 195 is not associated with the first self-propelled device 180. The relayed detection signal 195 may not include a hop count, but rather, upon receiving the relayed detection signal 195, the second controller device 190 can determine that the relayed detection signal 195 is associated with the second self-propelled device 199 based on a time delay. Thus, the second controller device 190 can correlate the relayed detection signal 195 with the second self-propelled device's 199 interaction with the sensor 194 of the sensor device 192, and log the detection event accordingly.

On the opposing end, when the first self-propelled device 180 interacts with the sensor device 196 connected to the second controller device 190, a detection signal 183 may be transmitted from the first self-propelled device 180 to the first controller device 100. The event module 140 can receive the detection signal 183 and determine that a correlated detection signal has not been received from a sensor device connection to the first controller device 100. In response to the detection event, the sensor device 196 can transmit a detection signal 119 to the second controller device 190, which can determine that the detection signal 119 is not associated with the second self-propelled device 199. Accordingly, the second controller device 190 can generate a relay signal 116 for transmission to the first controller device 100 indicating the detection event with the sensor 198 of sensor device 196.

The first controller device 100 can receive the relay signal 116 and correlate the detection signal 183 received from the self-propelled device 180 with the relay signal 116. Thus, the event module 140 can determine that the relay signal 116 is associated with an interaction between the first self-propelled device 180 and the sensor 198 of sensor device 196, and log the detection event 142 in the event log 172 accordingly.

Further implementations involving multiple controller devices, in connection with multiple self-propelled devices and sensor devices are contemplated. For example, several controller devices may initiate a control session, each operating a respective self-propelled device. There may be several more sensor devices strewn throughout a remote controlled device park environment, such as a gameplay area or race track. Such sensor devices may include finish line sensors, checkpoint sensors, destination sensors for task-oriented applications, barrier sensors, obstacle sensors, demerit sensors (e.g., for penalties), and ramp sensors (e.g., for performed tricks or bonuses). During the initial control session, the controller devices may initiate negotiations to determine which sensor devices are to be connected with which controller devices. Accordingly, pairings may be made and connections established to initiate the control session. Thus, the controlled device 100 may be one of many controller devices operating a respective self-propelled device in a device park environment.

During the control session, any number of controller devices (and corresponding self-propelled devices) may join. On the controller device 100, the negotiation module 150 may dynamically communicate with the other controller devices to determine whether the connections to any of the sensor devices may be handed off to newly joined controller devices. Based on the negotiations, the negotiation module 150 can direct disconnect commands 152 and connect commands 154 dynamically to manage connections with sensor devices based on the dynamic negotiations. Upon completion of the control session, for example, when a user deactivates the control application 174, the connection engine 160 can disconnect all connections to sensor devices. As a variation, upon user input to end the control session, the negotiation module 150 can direct a communication to the other controller devices to initiate negotiations for the sensor devices connected to the first controller device 100. Event detection and logging for multiple device examples is described in detail below with respect to FIG. 2.

Load-Balancing Negotiation and Detection Logging

FIGS. 2A-2B illustrate an example of a negotiation process for dynamic load balancing of sensor connections between computing devices. In the examples provided in connection with FIGS. 2A-2B, three mobile computing devices connected with three respective self-propelled devices are provided for illustrative purposes. Furthermore, load balancing is performed using six sensors, which may be implemented in remote sensor devices (e.g., sensor devices 192, 196) as discussed above with respect to FIG. 1. However, the below negotiations and load-balancing description with respect to FIGS. 2A-2B may be propagated to encompass any number of computing devices (e.g., controller device 100 and second controller device 190), and any number of sensor devices.

Referring to FIG. 2A, a first computing device (MCD 1) 202 and a second computing device (MCD 2) 204 can initiate a control session. In the example provided, the MCD 1 202 can establish connections with three sensor devices 232, 234, and 236, and MCD 2 can establish connections with another three sensor devices 238, 242, and 246. MCD 1 202 can further be connected with a first self-propelled device (SPD 1) 212. MCD 2 can further be connected with a second self-propelled device (SPD 2) 214. Thus, control operations instigated by a user of MCD 1 202 may be transmitted to SPD 1 212, and interactions between SPD 1 212 and sensor devices 232, 234, and 236 may be logged directly based on correlated detection signals received from SPD 1 and the connected sensor devices 232, 234, and 236, as described in connection with FIG. 1.

Furthermore, indirect detection events may be logged by MCD 1 202 based on interactions between SPD 1 212 and sensor devices 238, 242, and 246. As provided above, the indirect detection events may be determined based on a time delay or a hop count embedded in a relay signal provided by MCD 2 204. The relay signal can be correlated to an interaction between SPD 1 212 and a respective one of sensor devices 238, 242, and 246, and the detection event may be logged accordingly.

The same goes for MCD 2 204. Direct detection events, corresponding to interactions between SPD 2 214 and sensors 238, 242, and 246 can be logged directly based on correlated detection signals received from SPD 2 214 and the sensor devices 238, 242, 246 with which SPD 2 214 interacted. Indirect detection events may be logged by MCD 2 204 based on interactions between SPD 2 214 and sensor devices 232, 234, and 236. These indirect detection events may be determined by MCD 2 204 based on a time delay or a hop count embedded in a relay signal provided by MCD 1 202. The relay signal may be correlated to an interaction between SPD 2 214 and a respective one of sensor devices 232, 234, and 236, and the detection event may then be logged accordingly.

A third computing device (MCD 3) 206, controlling a third self-propelled device (SPD 3) 216, can thereafter join the control session and communicate with MCD1 202 and MCD 2 204. Without receiving handoff connections, MCD 3 206 could interact with sensor devices 232, 234, 236, 238, 242, and 246. MCD 1 202 and MCD 2 204 can receive detection signals from their respective sensor devices 232, 234, 236, 238, 242, and 246, and determine that such detection signals are not associated with SPD 1 212 or SPD 2 214, and thereafter relay such detection signals to MCD 3 206 for detection event logging.

For example, SPD 3 216, under operation of MCD 3 2106, can interact with sensor device 232, which is connected to MCD 1 202. Accordingly, a detection signal 233 may be transmitted from sensor device 232 to MCD 1 202 and a correlated detection signal 217 may be transmitted from SPD 3 216 to MCD 3 206. MCD 1 202 can determine that the received detection signal 233 is not associated with SPD 1 212 since a corresponding signal was not received by SPD 1 212. Such determination may be made by, for example, attempting to correlate a unique identifier of the sensor 232 in the detection signal 233 with a signal received from SPD 1 212.

Thus, MCD 1 202 may generate a relay signal 203 for transmission to MCD 2 204 indicating the detection event. MCD 2 204 may also determine that the relay signal 203, with an embedded single hop count, is not associated with SPD 2 214. Thus, MCD 2 may generate relay signal 205 with an embedded double hop count for transmission to MCD 3 206, which may correlate the detection event corresponding to the relay signal 205 with the detection signal 217 received from SPD 3 216, and log the detection event accordingly. Such interactions and log events may occur dynamically. However, the addition of SPD 3 216 increases load on the connections of both MCD 1 202 and MCD 2 204 whenever SPD 3 interacts with sensor devices 232, 234, 236, 238, 242, and 246.

Load balancing negotiations may occur automatically upon detection of MCD 3 206 and SPD 3 216, or upon signal latency crossing a predetermined threshold. In the example provided above, the inclusion of MCD 3 206 and SPD 3 216 can cause latency in the connections between, for example, MCD 1 202 and SPD 1 212 such that control commands may be delayed in order to receive detection signals from the connected sensors 232, 234, and 236. Similar delays may occur between MCD 2 204 and SPD 2 214. Thus, in order to optimize bandwidth usage and spread the load, MCD 1 202, MCD 2 204, and MCD 3 206 can instigate load balancing negotiations to determine which of the sensor devices 232, 234, 236, 238, 242, or 246 to hand off to MCD 3 206.

The negotiation process may involve an identification of whether an odd or even number of sensor devices are included in the control session. If an odd number of sensor devices exist, the negotiations may employ a hierarchy for the mobile computing devices, with, for example, MCD 1 202 being tasked with taken the brunt of the load, MCD 2 204 thereafter, and MCD 3 206 last. Such a hierarchy may be based on an order in which the mobile computing devices initiated the control session. Alternatively, the negotiation process may employ a random selection process to create the hierarchy.

If however, an even number of sensor devices are identified, the negotiation process may select sensor devices for hand off such that each of MCD 1 202, MCD 2 204, and MCD 3 206 maintains a connection with the same number of sensor devices. Furthermore, the negotiation process may result in proximity and/or location identification such that closer sensor devices connect with proximate MCDs. Thus, in the example shown in FIG. 2B, the negotiation has resulted in the selection of sensor devices 242 and 246 for connection to MCD 3 206 based on proximity or location. The resultant selection means that MCD 1 202 hands off sensor device 236 to MCD 2 204, also based on proximity or location. Thus, each mobile computing device maintains a connection with the same number of sensor devices to optimize load.

Detection events may be similarly processed based on time delay or hop count. Each mobile computing device may have a single hop partner such that a single loop joins the mobile computing devices, and detection signals may be correlated to detection events based on hop count and/or time delay, as shown in FIG. 2B. Thus, a relayed detection signal from MCD 1 202 to MCD 3 206 can perform two hops, each being embedded into the relayed detection signal. When the relayed detection signal is received by MCD 3 206, a hop count of two may be readily identified. Since only three mobile computing devices are participating in the control session, MCD 3 206 can automatically log the detection event based on the maximum hop count. Such automatic logging of the detection event may be performed without MCD 3 206 correlating the relayed detection signal with a detection received from SPD 3 216, due to the maximum hop count being reached. Thus, for variations involving say, ten mobile computing device participants in a control session, if a particular mobile computing device received a relayed signal with nine hop counts embedded therein, the detection event may be automatically logged. Alternatively, a correlation operation may be performed any time a detection signal, or a relayed detection signal, is received.

In the example shown in FIG. 2B, SPD 1 212, under operational control of MCD 1 202, can interact with sensor device 234. Since MCD 1 202 is connected to both SPD 1 212 and sensor device 234, MCD 1 202 can receive detection signals 264, 265 from both devices respectively. An event filter 250 of MCD 1 202 can log both detection signals 264, 265 in the signal data log 260 upon receipt. The signal data log 260 can include a column for SPD 1 212 and a column (or multiple columns) for remote device, such as sensor devices and other mobile computing devices. The remote devices column may be a "trigger" column, in that logged signal data in the remote devices column can trigger the event filter 250 to perform an automatic correlation operation to determine whether a correlated signal has been received in the SPD 1 column. Thus, the event filter 250 can log data from the detection signal 264 and also log data from the sensor signal 265, which can trigger the event filter 250 to correlate the sensor signal 265 with the detection signal 264. Confirmation of the correlation may be provided via timing data and/or unique identifiers for the sensor device 234 and/or SPD 1 212 embedded in the signals 264, 265. Upon performing the correlation, the detection event may be logged and/or tallied, and the logged data for detection signal 264 and sensor signal 265 in the signal data log 260 may be flushed.

As another example, MCD 1 202 can receive a detection signal 257 from SPD 1 212. The event filter 250 can log the detection event for detection signal 253 in SPD 1 column of the signal data log 260. At substantially the same time, MCD 3 206 can receive a sensor signal 263 from sensor 246. MCD 3 206 can determine that the sensor signal 263 is not associated with an SPD 3 216 detection event, and thus, embed a hop count and relay the sensor signal 263 to MCD 1 202. Upon receipt, the event filter 250 can log data from the sensor signal 263 in the remote devices column of the signal data log, and identify the hop count (1). The log event in the remote devices column can trigger the event filter 250 to perform a correlation operation to determine whether the relayed sensor signal 263 corresponds to a detection signal received from SPD 1. The event filter 250 can correlate the relayed signal 263 to the detection signal 257, the detection event can be logged or tallied, and data from the detection signal 257 and the relayed sensor signal 263 can be flushed.

Accordingly to some examples, the event filter 250 may also maintain a flush pointer 259 that can automatically flush the signal data log 260 at a certain row based on timing and/or hop count. As an example, MCD 1 202 can receive a detection signal 253 from SPD 1 212 and the event filter 250 can log the detection signal 253 data in the signal data log 260. The detection signal 253 may correspond to an interaction between SPD 1 212 and sensor device 238. The event filter 250 can either (i) automatically log or tally the detection event (e.g., in accordance with gameplay or race rules) after a predetermined time or hop count detection, or (ii) await receipt of a corresponding relayed sensor signal 251 (with hop count 2) and perform the correlation operation.

The predetermined time may be defined by a specified time it takes to receive and process a single hop count relay signal from MCD 3 206. If the specified time has elapsed, then the event filter 250 can surmise that SPD 1 212 must have interacted with one of sensor device 236 or sensor device 238, and automatically log the detection event. The flush pointer 259, managed by the event filter 250 can reflect the specified time, and thus any logged SPD 1 detection signal data that reaches the flush pointer can trigger a log or tally of the detection event. In line with the above discussion, utilization of the flush pointer 259 by each of MCD 1 202, MCD 2 204, and MCD 3 206, can cause a relayed sensor signal (e.g., relay signal 251 (hop count 2)) to be automatically discarded once "hop count 2" is embedded. This is due to the automatic logging or tallying of the detection event once the specified time, associated with the flush pointer 259, has elapsed.

Alternatively, the event filter 250 may await receipt of the relayed sensor signal 251. Upon receiving the relayed sensor signal 251 (with hop count 2 embedded therein), the event filter can log the same in the remote devices column, which can trigger a correlation operation. The event filter 250 can determine that the relayed sensor signal 251 is associated with the detection signal 253, and thereafter log or tally the detection event and flush the signal data log 260.

Various alternatives are contemplated in which any number of mobile computing devices, self-propelled devices, and sensor devices can participate in a given control session. Such devices may be joined at the initiation of the control session, or any time during the control session. Dynamic load balancing negotiation can be enabled or triggered whenever a mobile computing device joins or exits the control session. Signal data logs and event filters can execute rules, such as race or gameplay rules, to ensure consistent and dynamic detection event logging over the course of a control session. Furthermore, instead of a closed hop loop as shown in FIG. 2B, examples are contemplated in which received sensor signals that are not associated with a connected self-propelled device are propagated to every other computing device participating in the control session for correlation.

Methodology

Figure 3:
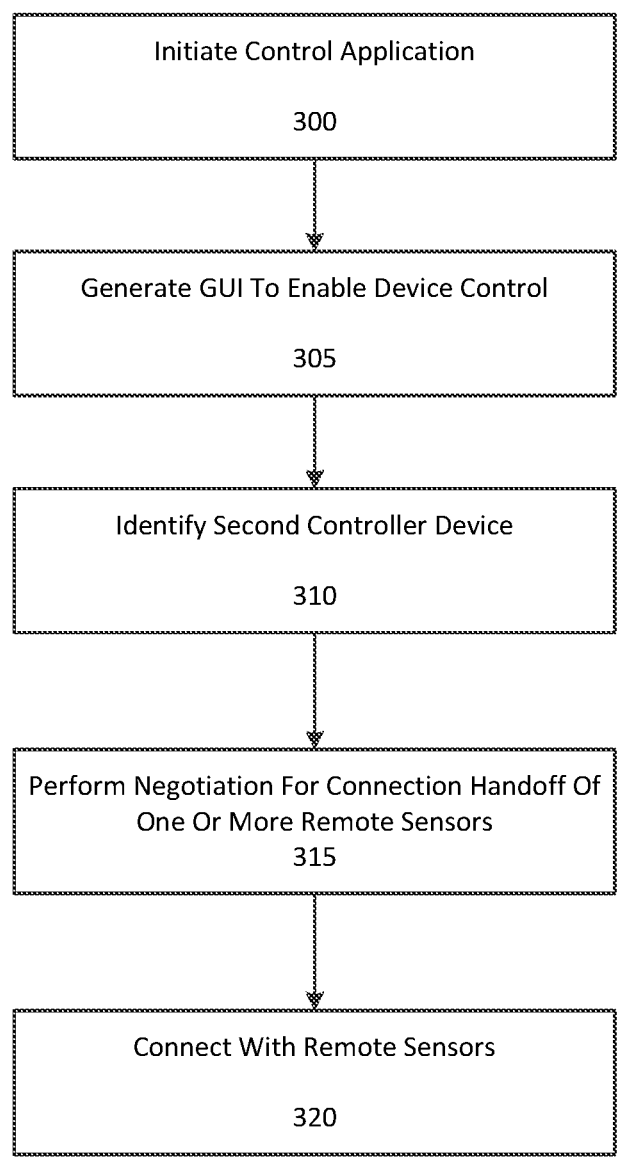
FIG. 3 is a high level flow chart describing an example process of connection handoff between computing devices.

FIG. 3 is a high level flow chart describing an example process of connection handoff between computing devices. In the below discussion of FIG. 3, reference may be made to like reference characters representing various features of FIG. 1 for illustrative purposes. Furthermore, the high level method described in connection with FIG. 3 may be performed by the controller device 100 as illustrated in FIG. 1 or the mobile computing devices (e.g., MCD 1 202) as illustrated in FIGS. 2A-2B. Referring to FIG. 3, the controller device 100 can initiate a control application 174 (300). The executed control application 174 can generate a graphic user interface 173 for display on the display of the controller device 100 (305).

Launch of the control application 174 can initiate a control session in which the controller device 100 can operate alone, or any number of other controller devices can join. For solo operations, the controller device 100 can detect and connection with any number of remote sensors (e.g., sensor devices 192, 196). Thus, the user of the controller device 100 can operate the self-propelled device 180 during the solo control session and the even module 140 can log each detection event accordingly. However, in accordance with many examples described herein, the controller device 100 can detect and/or identify a second controller device 190 (310). Upon initiation of the control session, the controller device 100 and the second controller device 190 can perform a negotiation for which remote sensors each controller device is to connect with (315). For example, the controller device 100 and the second controller device 190 can select remote sensors for connection based on proximity and/or an equal or substantially equal number for connection. Based on the negotiations, the controller device 100 can connect with the respective remote sensors (320).

Figure 4:
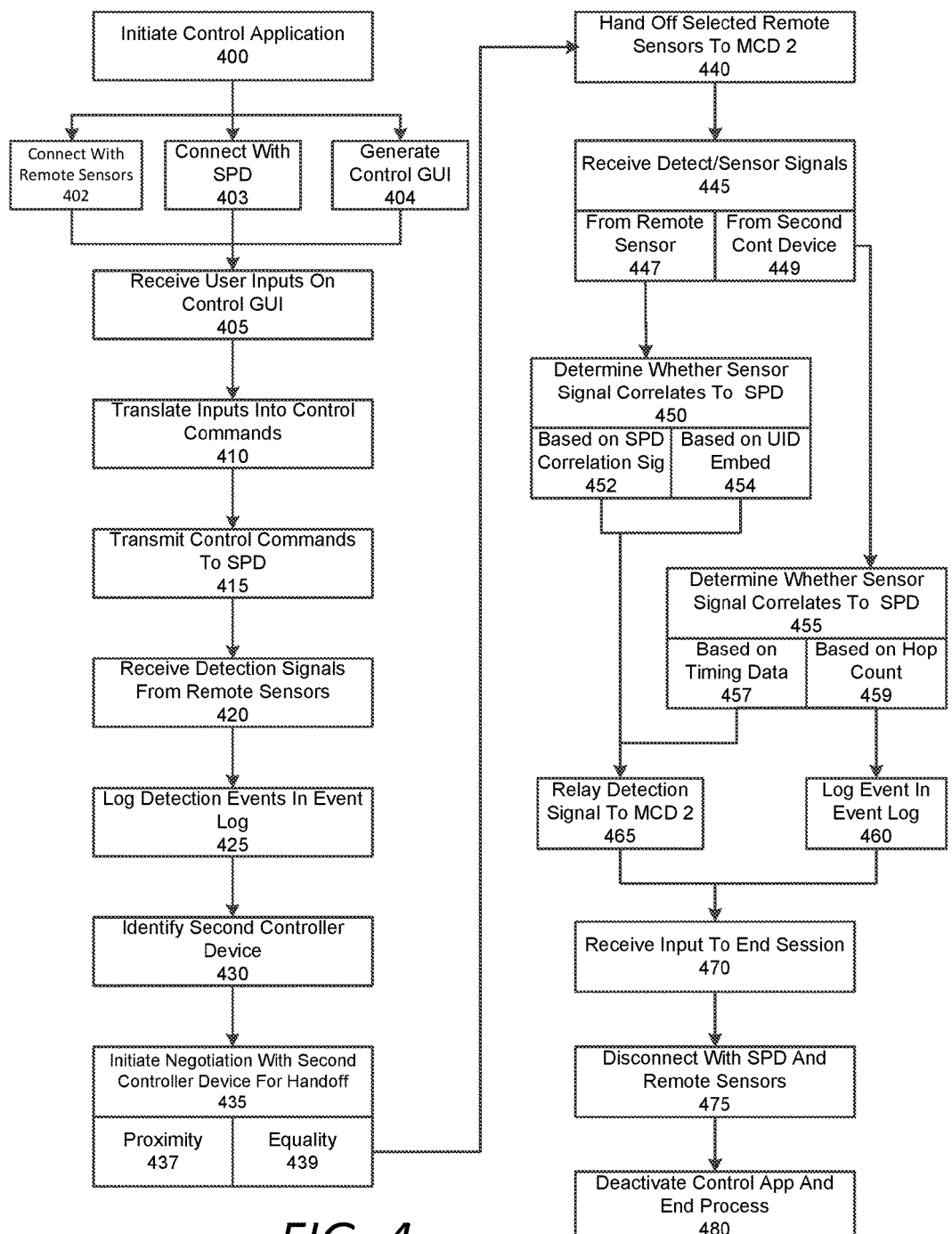
FIG. 4 is a low level flow chart describing an example process of performing a connection handoff while processing detection events.

FIG. 4 is a low level flow chart describing an example process of performing a connection handoff while processing detection events. In the below discussion of FIG. 4, reference may be made to like reference characters representing various features of FIG. 1 for illustrative purposes. Furthermore, the low level method described in connection with FIG. 4 may be performed by the controller device 100 as illustrated in FIG. 1 or the mobile computing devices (e.g., MCD 1 202) as illustrated in FIGS. 2A-2B. Referring to FIG. 4, the controller device 100 can initiate the control application 174 to start or join a control session (400). Execution of the control application can automatically cause the controller device 100 to connect with the self-propelled device 180 (403). Furthermore, execution of the control application 174 can cause the graphic user interface 173, including the virtual controls 177 to enable a user to operate the self-propelled device 180, to be generated on the display 130 (404).

According to examples, the controller device 100 can initially detect and connect with a number of remote sensors for the control session (402). Alternatively, the controller device 100 can detect one or more other controller devices (430), such as the second controller device 190, and initiate negotiations with the other controller devices to determine which remote sensors each controller device is to connect with (435). However, for solo control sessions, the controller device 100 can receiver user inputs 132 on the graphic user interface 173 (405). The controller device 100 can then translate the user inputs 132 into control commands 122 (410), and transmit the control commands 122 to the self-propelled device 180 for implementation on the internal drive mechanism 186 (415). During the control session, the controller device 100 can receive detection signals from the self-propelled device 180 and the remote sensors (420) in order to log and tally detection events in accordance with control application rules (425).

During the control session, the second controller device 190 can initiate a resident control application 174 to join the control session. Thus, the first controller device 100 can identify the second controller device 190 when the second controller device 190 joins (430). While the first controller device 100 controls the self-propelled device 180, the first and second controller devices 100, 190 can initiate negotiations to hand off the connection of one or more of the remote sensors (435). The negotiation can involve an identification of the sensors and their locations, as well as the locations of the controller devices 100, 190. Thus, the remote sensor connection handoff may be based on the proximity of remote sensor devices to the second controller device 190 (437). Additionally or alternatively, the first controller device 100 can negotiate to hand off selected remote sensors such that the first and second controller devices 100, 190 share an equal or substantially equal load—having the same or similar number of remote sensor connections (439).

When the remote sensors are selected for handoff, the first controller device 100 can disconnect from the selected remote sensors, and the second controller device can connect with those selected remote sensors (440). The connection handoff may occur seamlessly—that is, the connection handoff of the selected remote sensors may occur as a background operation without disrupting control of the self-propelled device 180.

After the selected remote sensors have been handed off to the second controller device 190, the first controller device 100 can receive detection and sensor signals (445) during the control session. As provided above, the detection signals are received from the self-propelled device 180. The sensor signals, however, may be received directly from remote sensors connected to the first controller device 100 (447), or relayed sensor signals received from the second controller device 190 (449).

For sensor signals received directly from connected remote sensors (447), the first controller device 100 can perform a correlation operation to determine whether the received sensor signal is associated with the self-propelled device 180 (450). The first controller device 100 can determine this association by either (i) correlating the sensor signal to a detection signal received from the self-propelled device 180 (452), or (ii) parsing the sensor signal to identify a unique identifier for the self-propelled device 180 embedded in the sensor signal (454).

If the first controller device 100 determines that the sensor signal is associated with the self-propelled device 180, then the first controller device 100 can log the detection event in an event log 172 (460)—which thus may be reflected on a tally feature 175 displayed as a score, ranking, progress indicator, etc. on the display 130. If the first controller device 100 determines that the sensor signal is not associated with the self-propelled device 180, then the first controller device 100 can relay the sensor signal to the second controller device 190 (465).

For sensor signals received from the second controller device 190 (449), the first controller device 100 can again perform a correlation operation to determine whether the sensor signal is associated with the self-propelled device 180 (455). The first controller device 100 can determine whether the relayed sensor signal is associated with the self-propelled device 180 based on timing data (457). For example, an elapsed time between receiving the detection signal from the self-propelled device 180 and the relayed sensor signal from the second controller device 190 can indicate that the signals are associated. In variations, the first controller device 100 can determine whether the relayed sensor signal is associated with the self-propelled device 180 by identifying a hop count in the signal (459), and thereafter correlating the relayed sensor signal with the detection signal received from the self-propelled device 180. Thus, the first controller device 100 can log the detection event in the event log 172. As an alternative, the first controller device 100 can automatically log the event based on receiving the sensor signal from the second controller device 190.

To end the control session, the first controller device 100 may receive an input to end the session, such as an input to deactivate the control application 174 (470). In response to receiving the input, the controller device 100 can disconnect with the self-propelled device 180 and the remote sensors (475), and deactivate the control application 174 to end the process (480).

Figure 5:
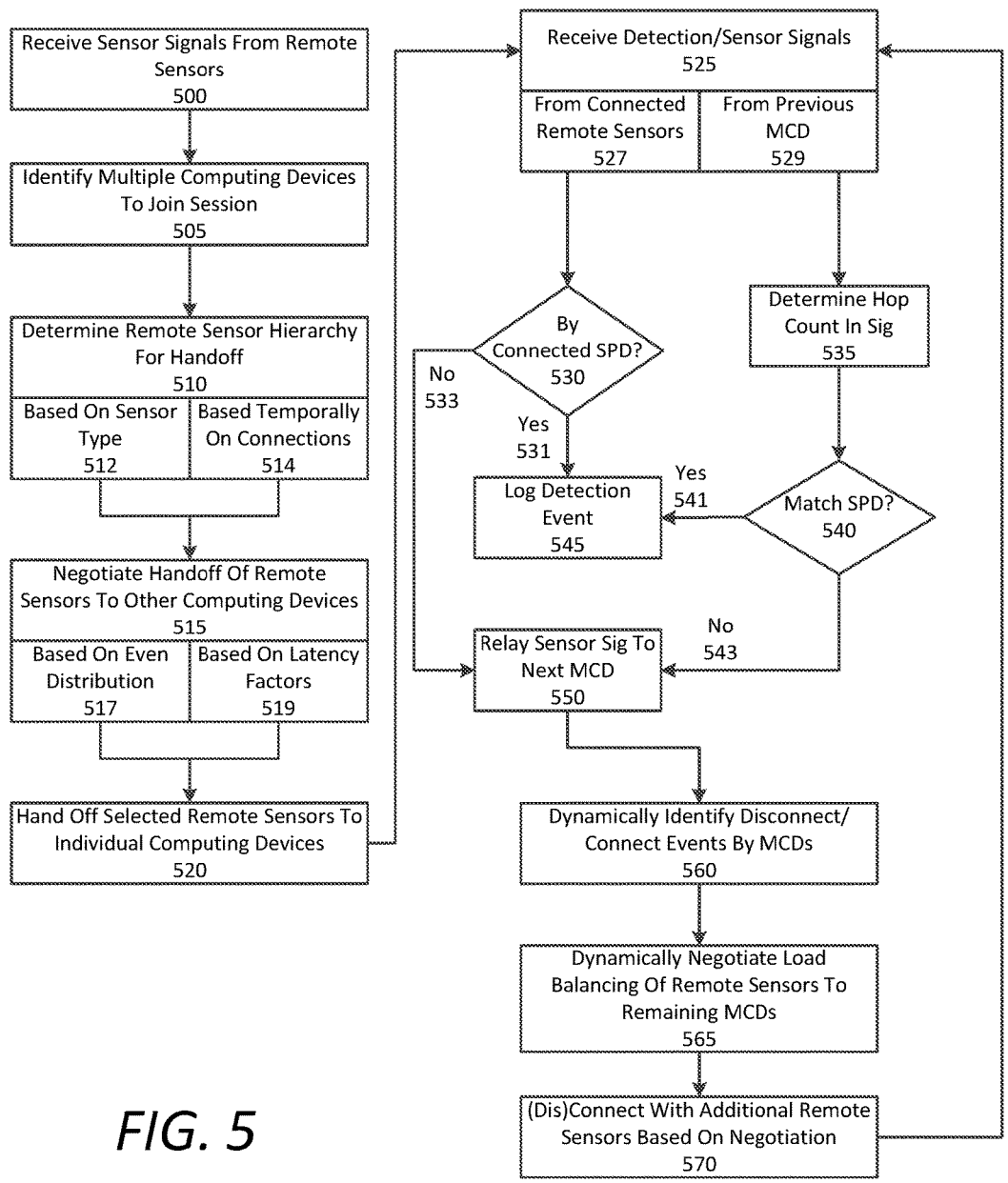
FIG. 5 is flow chart describing an example method of managing multiple connected devices using dynamic load balancing.

FIG. 5 is flow chart describing an example method of managing multiple connected devices using dynamic load balancing. In the below discussion of FIG. 5, reference may be made to like reference characters representing various features of FIG. 1 for illustrative purposes. Furthermore, the low level method described in connection with FIG. 5 may be performed by the controller device 100 as illustrated in FIG. 1 or the mobile computing devices (e.g., MCD 1 202) as illustrated in FIGS. 2A-2B. Referring to FIG. 5, the first controller device 100 may be participating in a live control session with several other controller devices. Accordingly, the controller device 100 can receive sensor signals from various remote sensors connected to the controller device 100 (500). During the control session, multiple other computing devices can initiate resident control applications 174 to join the control session (505). As an example, the user of the controller device 100 can operate the self-propelled device 180 in an remote controlled device park environment or race track. Other users can join or drop out of the control session at various stages or at random.

Upon detecting joining controller devices, the first controller device 100 can determine or identify a remote sensor hierarchy for connection handoff to the joining controllers (510). The hierarchy may be based on a sensor type (512). For example, remote sensors may be featured on ramps, barriers, a finish line, etc. A number of these sensors may be prohibitively flagged such that handoff is forbidden. As an example, users may own their own remote sensors, and thus may set these remote sensors for exclusive connection with respective controller devices. Furthermore, certain sensors, such as ramp sensors, may be permissibly transferred to any controller device, and thus may be provided hierarchically as such. Alternatively, as controllers join and exit the control session, remote sensors may be hierarchically order temporally (514) based on, for example, a first to connect system. Thus, remote sensors whose connections have been dropped due to an exiting controller, or remote sensors that have been connected to a controller device the longest, may be placed automatically at the top of the sensor hierarchy for handoff.

According to examples, the first controller device 100 and the other controller devices can perform background negotiates for connection handoff of remote sensors during the control session (515). The background negotiations may take into account the sensor hierarchy. Additionally or alternatively, the negotiations may be initiated with the goal of an even distribution of remote sensors in order to optimize bandwidth usage (517). Further, such negotiations may take into account signal latency (519) for controllers using different connection protocols, controllers requiring more bandwidth, and the like. Thus, selected remote sensors may be handed off to selected controllers in accordance with the dynamic negotiation (520). Such selections may be made by a parent device, such as controller device 100. Thus, the controller device 100 can instigate the negotiation and selection of remote sensors for handoff to selected controllers. Alternatively, each of the controllers may engage in communications to negotiate handoffs.

Accordingly, during the control session, while dynamic background negotiations for remote sensor handoff are taking place, the first controller device 100 can receive detection signals from the self-propelled device 180 and sensor signals (525). The sensor signals may be received from remote sensors connection to the first controller device 100 (527) or from a next controller device (529) in a closed loop. In order to maintain the closed loop of controller device such that correlations may be determined based on signal hop count or time delay, the joining and exiting of controllers can cause the controllers to continuously maintain a group hierarchy such that each controller device receives relayed signals from a first partner device, and relays signals to a second partner device. Alternatively, sensor signals not associated with a connected self-propelled device may be propagated to all or a selection of controllers participating in the control session.

For sensor signals received from connected remote sensors (527), the first controller device 100 can determine whether the sensor signal is associated with the self-propelled device 180 (530), as described above. If so, (531) the first controller device 100 can log the detection event (545). However, if not (533), the first controller device can relay the sensor signal to a next controller device (550).

For sensor signals received from a previous controller device (259), the first controller device 100 can identify a hop count or time delay in the sensor signal (535), and determine whether the hop count of time delay matches the receipt of the detection signal from the self-propelled device 180 (540). If the hop count or time delay matches the detection signal (541), the first controller device 100 can log the detection event in the event log 172 (545). However, is the hop count or time delay does not match the receipt of the detection signal (543), then the first controller device 100 can relay the sensor signal to the next controller device (550).

At any given time during the control session, the first controller device 100 and/or any number of the other controller devices, can dynamically identify connection and disconnection events by controller devices joining or exiting the control session (560). Based on such events, the first controller device 100 and/or the other controllers can dynamically negotiate load balancing of the remote sensor connections to remainder controller devices participating in the control session (565). Thus based on the negotiations, the first controller device may connect or disconnect with any number of remote sensors over the course of the control session (570).

Figure 6:
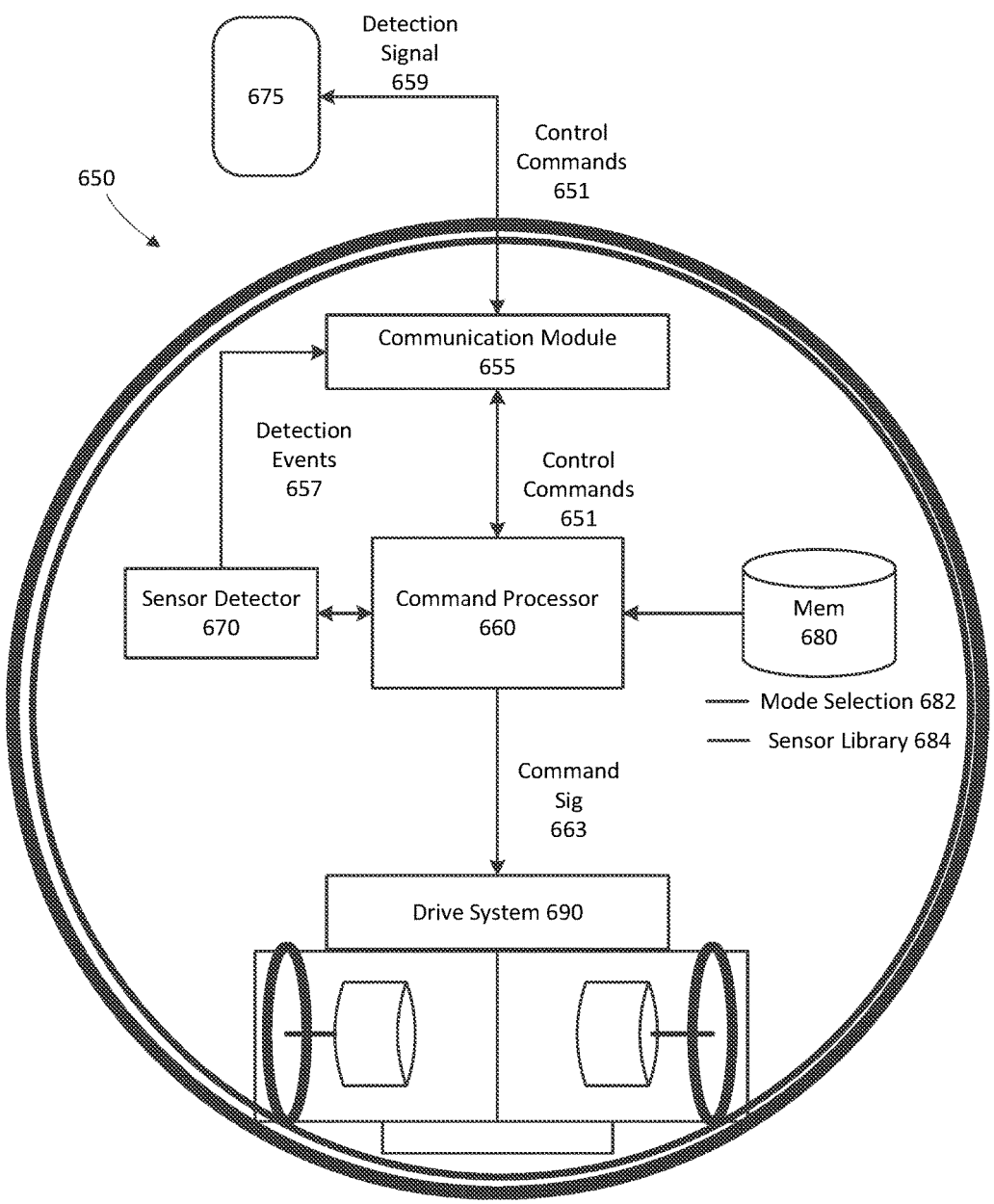
FIG. 6 illustrates an example self-propelled device utilized in connection with example processes described herein.

FIG. 6 illustrates an example self-propelled device utilized in connection with example processes described herein. In the example provided, a controller device 675 may be implemented as one or more of the example devices described herein. For example, the controller device 675 may be implemented as the controller device 100, as described with respect to FIG. 1, or the mobile computing device (e.g., MCD 1 202) as discussed with respect to FIGS. 2A-2B. Referring to FIG. 6, the self-propelled device 650 can include a communication module 655 to receive control commands 651 from the controller device 675. The self-propelled device 650 can include a command processor 660 to process the control commands 661 to implement command signals 663 on a drive system 690. The drive system 690 may be an internal drive system including independent motors and wheels engaged to an inner surface of a spherical housing of the self-propelled device 650. Alternatively, the drive system 690 may comprise a propulsion system including wheels, propellers, motor(s), and/or other propulsion mechanisms.

The self-propelled device 650 can include a memory 680 to store mode selection instructions 682 (e.g., for sleep mode, control mode, sensor mode, and the like). The memory can further include a sensor library 684 to, for example, identify individual remote sensors with which the self-propelled device 650 interacts.

During operation, the self-propelled device 650 can come into contact or interact with a number of remote sensors. Such events may be detected by a sensor detector 670 of the self-propelled device 650. The sensor detector 670 can transmit detection events 657 to the communication module 655, which can communication detection signals 659, corresponding to the detection events 657, to the controller device 675. Additionally, the sensor detector 670 can identify, using the sensor library 684, which particular remote sensors with which the self-propelled device 650 interacted, and communication such information in the detection events 657.

Hardware Diagram

Figure 7:
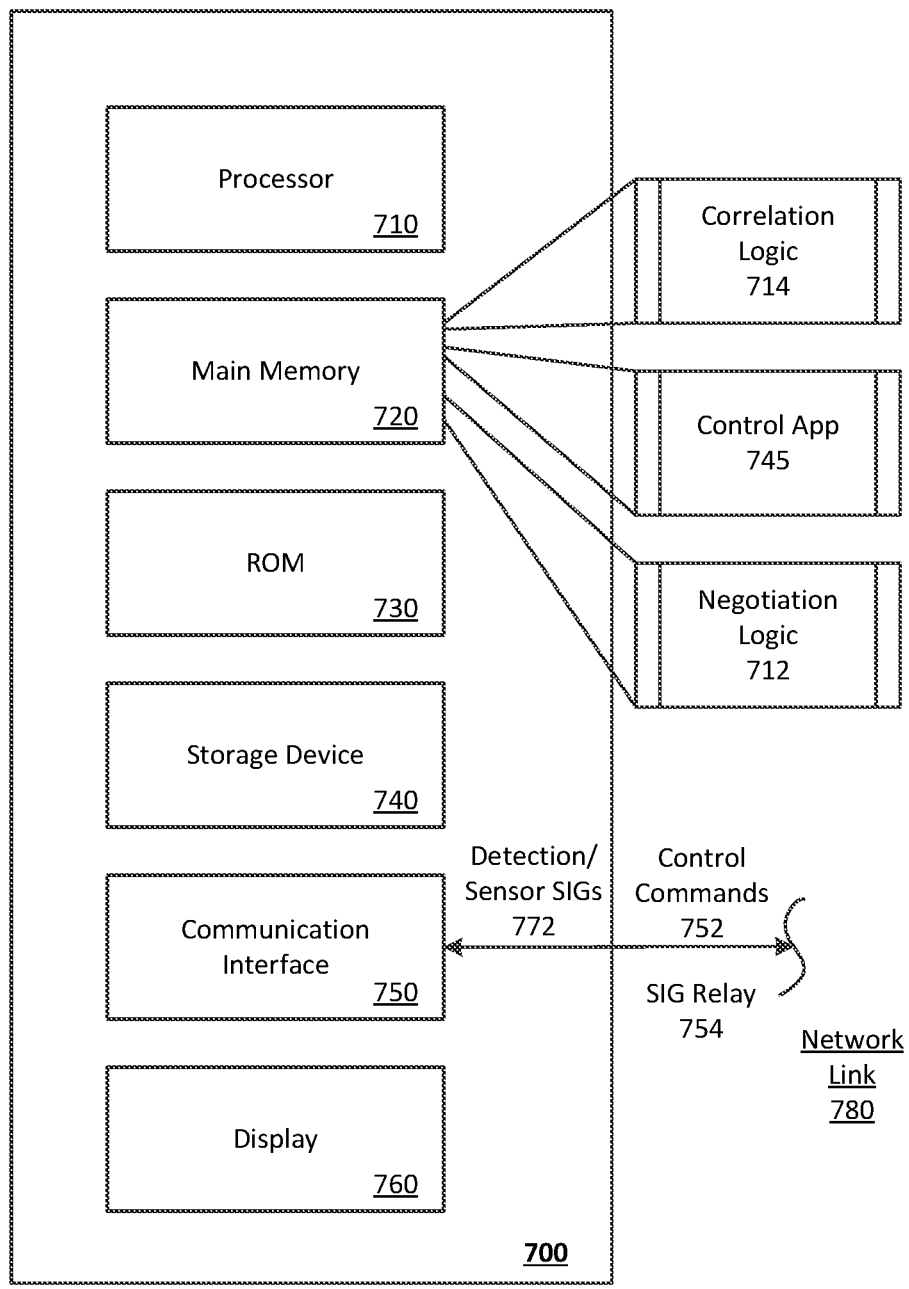
FIG. 7 is a block diagram that illustrates a computer system upon which examples described may be implemented.

FIG. 7 is a block diagram that illustrates a computer system upon which examples described may be implemented. For example, one or more components discussed with respect to the systems and the methods described herein may be performed by the system 700 of FIG. 7. The systems and methods described can also be implemented using a combination of multiple computer systems as described by FIG. 7.

In one implementation, the computer system 700 includes processing resources 710, a main memory 720, ROM 730, a storage device 740, a communication interface 750, and a display 760. The computer system 700 includes at least one processor 710 for processing information and a main memory 720, such as a random access memory (RAM) or other dynamic storage device, for storing information and instructions to be executed by the processor 710. The main memory 720 also may be used for storing temporary variables or other intermediate information during execution of instructions to be executed by the processor 710. The computer system 700 may also include a read only memory (ROM) 730 or other static storage device for storing static information and instructions for the processor 710. A storage device 740, such as a magnetic disk or optical disk, is provided for storing information and instructions. For example, the storage device 740 can correspond to a computer-readable medium that store instructions performing negotiation and correlation operations discussed with respect to FIGS. 1-6.

The communication interface 750 can enable computer system 700 to communicate with a self-propelled device (e.g., cellular or Wi-Fi network) through use of a network link (wireless or wire line). Using the network link, the computer system 700 can communicate with a plurality of devices, such as the self-propelled device 180. The main memory 720 of the computer system 700 can further store the control application 745 which can be initiated by the processor 710. According to some examples, launch of the control application 745 can cause connections to be established with the self-propelled device and/or remote sensor devices. Furthermore, the computer system 700 can receive detection and sensor signals 772 from the self-propelled device and remote sensors respectively. Accordingly, the processor 710 can execute negotiation logic 712 and correlation logic 714 to perform handoff negotiations and correlate between detection and sensor signals received from the self-propelled device and the remote sensors.

The computer system 700 can further transmit control commands 752 to the self-propelled device over a network link 780. Such commands 752 may be transmitted in accordance with the executed control application 745. Furthermore, in accordance with the control application 745, non-correlated sensor signals 754 may be relayed to one or more other computer systems.

Examples described herein are related to the use of computer system 700 for implementing the techniques described herein. According to one example, those techniques are performed by computer system 700 in response to processor 710 executing one or more sequences of one or more instructions contained in main memory 720, such as the control application 745, negotiation logic 712, or correlation logic 714. Such instructions may be read into main memory 720 from another machine-readable medium, such as storage device 740. Execution of the sequences of instructions contained in main memory 720 causes processor 710 to perform the process steps described herein. In alternative implementations, hard-wired circuitry and/or hardware may be used in place of or in combination with software instructions to implement examples described herein. Thus, the examples described are not limited to any specific combination of hardware circuitry and software.

CONCLUSION

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that this disclosure is not limited to those precise examples. As such, many modifications and variations will be apparent to practitioners skilled in this art. Accordingly, it is intended that the scope of this disclosure be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude the inventor from claiming rights to such combinations.

Although illustrative examples have been described in detail herein with reference to the accompanying drawings, variations to specific examples and details are encompassed by this disclosure. It is intended that the scope of the invention is defined by the following claims and their equivalents. Furthermore, it is contemplated that a particular feature described, either individually or as part of an example, can be combined with other individually described features, or parts of other examples. Thus, absence of describing combinations should not preclude the inventor(s) from claiming rights to such combinations.

While certain examples have been described above, it will be understood that the examples described are by way of example only. Accordingly, this disclosure should not be limited based on the described examples. Rather, the scope of the disclosure should only be limited in light of the claims that follow when taken in conjunction with the above description and accompanying drawings.

What is claimed is:

1. A computing device comprising:
    a touch-sensitive display;
    one or more processors; and
    one or more memory resources storing instructions that, when executed by the one or more processors, cause the computing device to:
        wirelessly connect with a plurality of remote sensors;
        generate a graphic user interface on the touch-sensitive display to enable a user to remotely operate a first self-propelled device to interact with the plurality of remote sensors;
        identify a second computing device operating a second self-propelled device to interact with the plurality of remote sensors; and
        perform a connection handoff of one or more of the plurality of remote sensors to the second computing device.

2. The computing device of claim 1, wherein the instructions, when executed by the one or more processors, further cause the computing device to:
    based on user inputs on the graphic user interface, transmit control commands to maneuver the first self-propelled device to interact with a first one of the plurality of remote sensors, the first remote sensor being connected with the computing device; and
    receive a detection signal from the first remote sensor indicating a detection event corresponding to one of the first or the second self-propelled devices interacting with the first remote sensor.

3. The computing device of claim 2, wherein the instructions, when executed by the one or more processors, further cause the computing device to:
    in response to receiving the detection signal from the first remote sensor, determine whether the detection event corresponds to the first self-propelled device interacting with the first remote sensor.

4. The computing device of claim 3, wherein the instructions, when executed by the one or more processors, further cause the computing device to:
in response to determining that the first self-propelled device interacted with the first remote sensor, log the detection event in the one or more memory resources.

5. The computing device of claim 3, wherein the instructions, when executed by the one or more processors, further cause the computing device to:
in response to determining that the first self-propelled device did not interact with the first remote sensor, transmit the detection signal to the second computing device.

6. The computing device of claim 1, wherein the instructions, when executed by the one or more processors, further cause the computing device to:
receive a detection signal from the second computing device;
determine whether the detection signal corresponds to the first self-propelled device interacting with a respective one of the one or more remote sensors connected with the second computing device; and
in response to determining that the detection signal corresponds to the first self-propelled device interacting with the respective remote sensor, log the detection event in the one or more memory resources.

7. The computing device of claim 6, wherein logging the detection event is based on the second computing device (i) receiving a signal from the respective remote sensor, and (ii) determining that the detection event did not correspond to the second self-propelled device interacting with the respective remote sensor.

8. The computing device of claim 6, wherein determining that the detection signal corresponds to the first self-propelled device interacting with the respective remote sensor is based on a single hop count indicated in the detection signal.

9. The computing device of claim 6, wherein the instructions, when executed by the one or more processors, further cause the computing device to:
identify a third computing device operating a third self-propelled device to interact with the plurality of remote sensors; and
perform a negotiation process with the second and the third computing devices to transfer a set of remote sensors to the third computing device, the set of remote sensors comprising (i) one or more of a remaining set of remote sensors connected with the computing device, and/or (ii) a number of the one or more remote sensors connected with the second computing device.

10. The computing device of claim 9, wherein the instructions, when executed by the one or more processors, further cause the computing device to:
receive a second detection signal from the second computing device;
determine whether the second detection signal corresponds to the first self-propelled device interacting with a select one of the plurality of remote sensors; and
in response to determining that the first self-propelled device interacted with the selected remote sensor, log a detection event corresponding to the second detection signal in the one or more memory resources based on the identified double hop count.

11. The computing device of claim 10, wherein determining whether the second detection signal corresponds to the first self-propelled device interacting with the selected remote sensor comprises identifying a double hop count in the second detection signal, the double hop count indicating that (i) the second detection signal originated from the third computing device, and (ii) neither the second nor the third self-propelled devices interacted with the selected remote sensor.

12. The computing device of claim 10, wherein determining whether the second detection signal corresponds to the first self-propelled device interacting with the selected remote sensor comprises determining an elapsed time in the second detection signal, the elapsed time indicating that the second detection signal originated from the third computing device.

13. The computing device of claim 1, wherein the plurality of sensors are included in one or more features of remote controlled device park environment.

14. The computing device of claim 13, wherein the one or more features comprise one or more ramps for self-propelled devices.

15. The computing device of claim 14, wherein the remote controlled device park environment comprises a race track, and wherein the plurality of sensors comprise at least one of a finish line sensor and one or more checkpoint line sensors.

16. The computing device of claim 1, wherein identifying the second computing device is based on a user selection of a handoff feature generated on the graphic user interface.

17. The computing device of claim 1, wherein identifying the second computing device is based on detecting the second computing device within a predetermined proximity of the computing device.

18. The computing device of claim 1, wherein the executed instructions comprise an executing gaming application that provides, on the graphic user interface, (i) a virtual steering mechanism for the first self-propelled device, and (ii) a points tally feature for detection events corresponding to the first self-propelled device interacting with the plurality of remote sensors.

19. A non-transitory computer-readable medium storing instruction that, when executed by one or more processors of a computing device, cause the computing device to:
wirelessly connect with a plurality of remote sensors;
generate a graphic user interface on a touch-sensitive display of the computing device, the graphic user interface enabling a user to remotely operate a first self-propelled device to interact with the plurality of remote sensors;
identify a second computing device operating a second self-propelled device to interact with the plurality of remote sensors; and
perform a connection handoff of one or more of the plurality of remote sensors to the second computing device.

20. A method for managing connections, the method performed by one or more processors of a computing device and comprising:
wirelessly connecting with a plurality of remote sensors;
generating a graphic user interface on a touch-sensitive display of the computing device, the graphic user interface enabling a user to remotely operate a first self-propelled device to interact with the plurality of remote sensors;
identifying a second computing device operating a second self-propelled device to interact with the plurality of remote sensors; and
performing a connection handoff of one or more of the plurality of remote sensors to the second computing device.

* * * * *